(12) United States Patent
Nakashima et al.

(10) Patent No.: US 8,556,332 B2
(45) Date of Patent: Oct. 15, 2013

(54) VEHICLE DOOR (75) Inventors: Atsushi Nakashima, Wako (JP); Hitoshi Ohki, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 0 days.

(21) Appl. No.: 13/606,532

(22) Filed: Sep. 7, 2012

(65) Prior Publication Data

US 2013/0076060 A1    Mar. 28, 2013

(30) Foreign Application Priority Data

Sep. 22, 2011   (JP) .................................. 2011-206761

(51) Int. Cl.
*B60R 5/04* (2006.01)
(52) U.S. Cl.
USPC ........................ 296/146.7; 296/146.5; 49/502
(58) Field of Classification Search
USPC ................................ 296/146.7, 146.5; 49/502
See application file for complete search history.

(56) References Cited

U.S. PATENT DOCUMENTS 6,955,392 B2 * 10/2005 Dry ............................ 296/146.7
7,370,906 B2 *  5/2008 Isobe et al. ................. 296/146.7

FOREIGN PATENT DOCUMENTS

JP       1-73017 U    5/1989
JP      05-238263 A   9/1993

* cited by examiner

*Primary Examiner* — Joseph Pape
*Assistant Examiner* — Dana Ivey
(74) *Attorney, Agent, or Firm* — Westerman, Hattori, Daniels & Adrian, LLP (57) ABSTRACT A vehicle door includes a door main body having a hollow portion, a work hole, a door hole seal that covers the work hole, a door trim, a protruding member provided so as to protrude from the door trim toward the vehicle interior side surface, and a harness routed through the door hole seal to the door trim side. The door hole seal is provided with a general surface, a bulging portion facing the protruding member and bulging from the general surface toward the inside of the hollow portion, and a harness pull-out hole through which the harness is passed. The bulging portion has an inclined surface.

9 Claims, 9 Drawing Sheets

FIG. 9

VEHICLE DOOR

CROSS REFERENCES TO RELATED APPLICATIONS

The present application claims priority under 35 U.S.C. §119 to Japanese Patent Application No. 2011-206761, filed Sep. 22, 2011, entitled "Vehicle Door." The contents of this application are incorporated herein by reference in their entirety.

TECHNICAL FIELD

The present disclosure relates to the structure of a vehicle door.

BACKGROUND

Hitherto, a vehicle door in which a door main body having a hollow portion therein is formed of an outer panel made of a metal plate and disposed on the vehicle exterior side and an inner panel made of a metal plate and disposed on the vehicle interior side and a door trim made of resin is attached to the vehicle interior side of the inner panel has been known as a door mounted on an automobile (see, for example, Japanese Unexamined Patent Application Publication No. 5-238263 (FIG. 1)).

Hitherto, work holes for installing electric components, such as a window regulator that raises and lowers a window pane and a door lock device that locks and unlocks the door, a speaker installation hole for installing a speaker, and harness pull-out holes through which harnesses connected to the electric components are passed have been formed in the inner panel of a vehicle door (see, for example, Japanese Unexamined Utility Model Registration Publication No. 1-73017 (FIG. 1 to FIG. 3)).

The vehicle door described in Japanese Unexamined Utility Model Registration Publication No. 1-73017 is provided with a door hole seal that covers the work holes, the speaker installation hole, and the harness pull-out holes formed in the vehicle interior side surface of the door main body so that water cannot enter and the door hole seal has many slits for pulling the harnesses out of the door main body.

In the vehicle door described in Japanese Unexamined Patent Application Publication No. 5-238263, a bulging portion formed integrally with the door hole seal or a bulging portion that is a separate component from the door hole seal and joined to the door hole seal by welding is provided in a part of the door hole seal (sealing screen) facing a speaker attached to the door trim so that when the speaker comes into contact with the door hole seal, the door hole seal is prevented from being pulled and peeled.

However, in the door hole seal (sealing screen) described in Japanese Unexamined Patent Application Publication No. 5-238263, when the speaker is disposed near a hole through which a harness is pulled out of the door main body, the harness comes into contact with and interferes with the bulging portion and the speaker, and it is difficult to provide the door hole seal with a bulging portion that is a separate component.

The door hole seal described in Japanese Unexamined Patent Application Publication No. 5-238263 does not have pull-out holes through which harnesses are passed and thus has a good waterproof property. However, when harnesses are pulled out of the door main body and routed, it is necessary to form pull-out holes in exposed parts of the inner panel that are not covered by the door hole seal and to route the harnesses so as to bypass the door hole seal. This is inefficient.

Since the door hole seal described in Japanese Unexamined Utility Model Application Publication No. 1-73017 has many slits through which harnesses are passed, the harnesses can be easily passed through the slits. However, when a protruding member is protruded from the door trim toward the door hole seal, the harnesses interfere with the protruding member.

SUMMARY

The present disclosure provides a vehicle door such that even when a bulging portion is provided in a door hole seal, a harness that is routed from a hollow portion in a door main body through the door hole seal to the door trim side can be routed without being interfered with a protruding member.

In an aspect of the present disclosure, a vehicle door includes a door main body having a hollow portion therein, a work hole provided in a vehicle interior side surface of the door main body, a door hole seal attached to the vehicle interior side surface so as to cover the work hole, a door trim provided on the vehicle interior side surface, a protruding member provided so as to protrude from the door trim toward the vehicle interior side surface, and a harness routed from the hollow portion through the door hole seal to the door trim side. The door hole seal is provided with a general surface extending along the vehicle interior side surface, a bulging portion facing the protruding member and bulging from the general surface toward the inside of the hollow portion, and a harness pull-out hole that is provided so as not to overlap with the protruding member as viewed from the vehicle interior-exterior direction and through which the harness is passed. The bulging portion has an inclined surface that is inclined such that the distance from the general surface increases toward the central part of the bulging portion in proportion to the distance from a connecting portion between the general surface and the bulging portion, and the harness pull-out hole is formed in the inclined surface. The inclined surface may or may not physically reach the general surface at one end. In the latter, the inclined surface may be connected to the general surface via a side wall.

According to this configuration, the door hole seal is provided with a bulging portion that faces the protruding member and bulges from the general surface toward the inside of the hollow portion, and a harness pull-out hole that is provided so as not to overlap with the protruding member as viewed from the vehicle interior-exterior direction and through which a harness is passed. Thus, even when the bulging portion and the harness pull-out hole are formed at the same position, the harness pulled out of the harness pull-out hole can be routed so as not to interfere with the protruding member. The vehicle door is provided with the harness pull-out hole that is provided so as not to overlap with the protruding member as viewed from the vehicle interior-exterior direction and through which a harness is passed. Thus, when the vehicle has a collision, and the door is pressed toward the vehicle interior and deformed, the interference between the harness and the protruding member can be suppressed. Since the harness pull-out hole is formed in the inclined surface, the amount of bulging of the bulging portion in side view can be reduced compared to the case where the harness pull-out hole is formed in a side surface (a surface extending in the vehicle interior-exterior direction) of a typical U-shaped bulging portion. Since the harness pull-out hole is formed in the inclined surface, the size (area) of the bulging portion in the direction along the general surface can be reduced compared to the case where the harness pull-out hole is formed in the bottom surface (the surface extending in the direction along the general surface) of a typical U-shaped bulging portion.

It is preferable that the bulging portion have a facing portion that extends from an end portion on the opposite side of the bulging portion from a foot portion of the inclined surface in a direction along the general surface to an edge portion of the inclined surface and that faces the protruding member.

According to this configuration, the bulging portion of the door hole seal is disposed such that the protruding member faces a facing portion extending from an end portion on the opposite side of the bulging portion from a foot portion of the inclined surface, through which the harness is routed, to the edge portion of the inclined surface. Thus, the harness is disposed away from the facing portion facing the protruding member. Thus, the interference between the harness and the protruding member can be suppressed more reliably.

It is preferable that the edge portion be disposed on the vehicle exterior side of the vehicle exterior side end of the protruding member, and the facing portion have a bulging side surface formed toward the vehicle exterior, from the general surface to the vicinity of the vehicle exterior side end of the protruding member, and a second inclined surface formed so as to be inclined from the end of the bulging side surface to the edge portion.

According to this configuration, the facing portion disposed so as to face the protruding member has a bulging side surface and a second inclined surface. Thus, when the vehicle has a side collision, the second inclined surface is elastically deformed. Thus, the amount of protruding of the facing portion in the vehicle interior-exterior direction and the size (area) of the facing portion in the direction along the general surface of the door hole seal can be minimized.

It is preferable that the inclined surface be provided adjacent to the edge of the work hole, and the inclined surface be disposed between the facing portion and the edge of the work hole.

According to this configuration, when the bulging portion is disposed adjacent to the edge of the work hole, the inclined surface is disposed adjacent to the edge of the work hole. Thus, compared to the case where the facing portion (particularly the inner and outer surfaces) is adjacent to the edge of the work hole, the interference between the bulging portion and the edge of the work hole can be suppressed.

It is preferable that the door hole seal have a flap that covers the harness pull-out hole, the flap have a joining portion that is joined to the door hole seal above the harness pull-out hole, the length of the joining portion in the door width direction be larger than the width of the harness pull-out hole in the door width direction, and the inclined surface extend in a direction intersecting with the door width direction. In the case of a side door, "door width direction" means the front-rear direction of the vehicle. In the case of a rear door (back door), it means the vehicle width direction.

According to this configuration, a flap is provided above the harness pull-out hole, and a joining portion longer than the harness pull-out hole is provided. Thus, the part of the door hole seal where the flap is installed also has a waterproof property, and a waterproof property can be ensured throughout the door hole seal. Since the inclined surface is formed in a direction intersecting with the door width direction, the length of the bulging portion in the door width direction can be reduced while securing the length of the joining portion.

It is preferable that the door main body have an abutment member provided in the hollow portion and facing the protruding member, and the harness pull-out hole be provided so as not to overlap with the abutment member as viewed from the vehicle interior-exterior direction.

According to this configuration, when the vehicle has a collision, and the door is pressed in the vehicle interior-exterior direction and deformed, the harness can be prevented from interfering with the abutment member, and particularly, from being caught between the abutment member and the protruding member.

BRIEF DESCRIPTION OF THE DRAWINGS

The advantages of the disclosure will become apparent in the following description taken in conjunction with the following drawings.

FIGS. 8A and 8B illustrate a molded cup body for the door hole seal provided in the vehicle door according to the embodiment of the present disclosure. FIG. 8A is an enlarged perspective view as viewed from the vehicle interior side, and FIG. 8B is an enlarged perspective view as viewed from the vehicle exterior side.

DETAILED DESCRIPTION

A vehicle door according to an embodiment of the present disclosure will be described below with reference to the drawings. In the embodiment of the present disclosure, "front" means the side in the travelling direction of the vehicle, "rear" means the side in the backing direction of the vehicle, "upper" means the vertically upper side, "lower" means the vertically lower side, and "left/right" means the side in the vehicle width direction.

Configuration of Door

Figure 1:
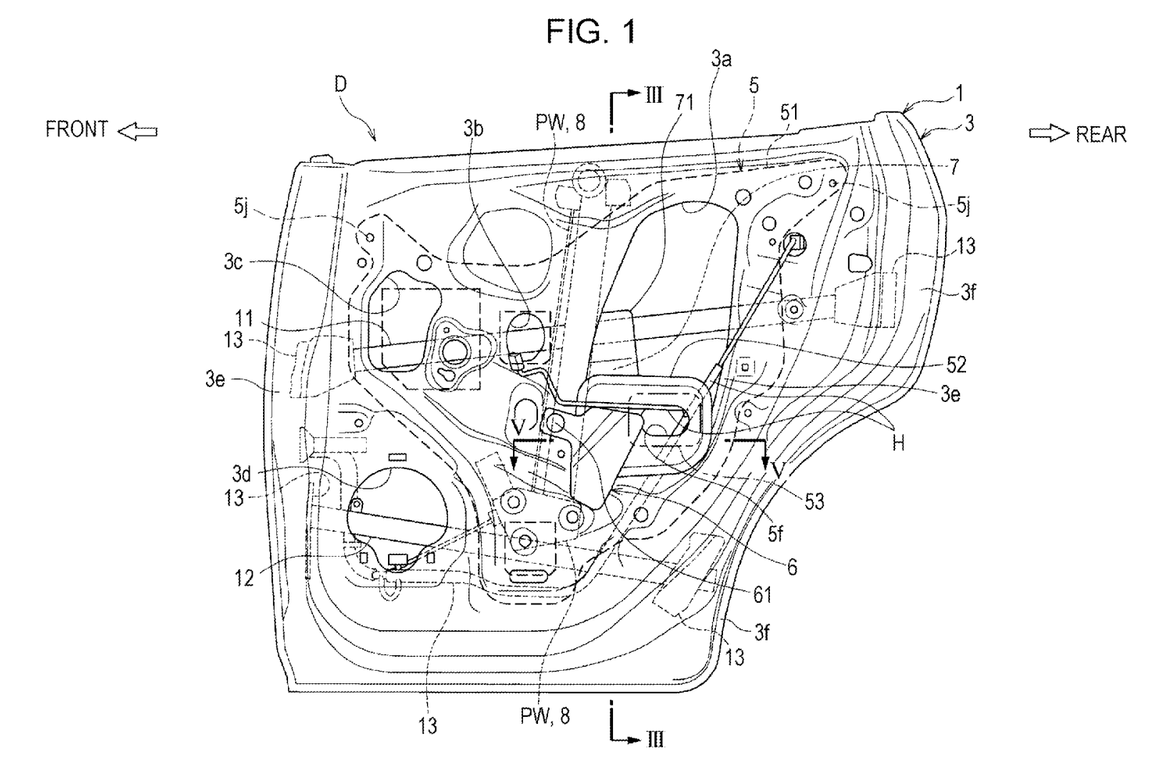
FIG. 1 illustrates an example of a vehicle door according to an embodiment of the present disclosure, and is a schematic front view illustrating the internal structure of the door as viewed from the vehicle interior side.
Figure 2:
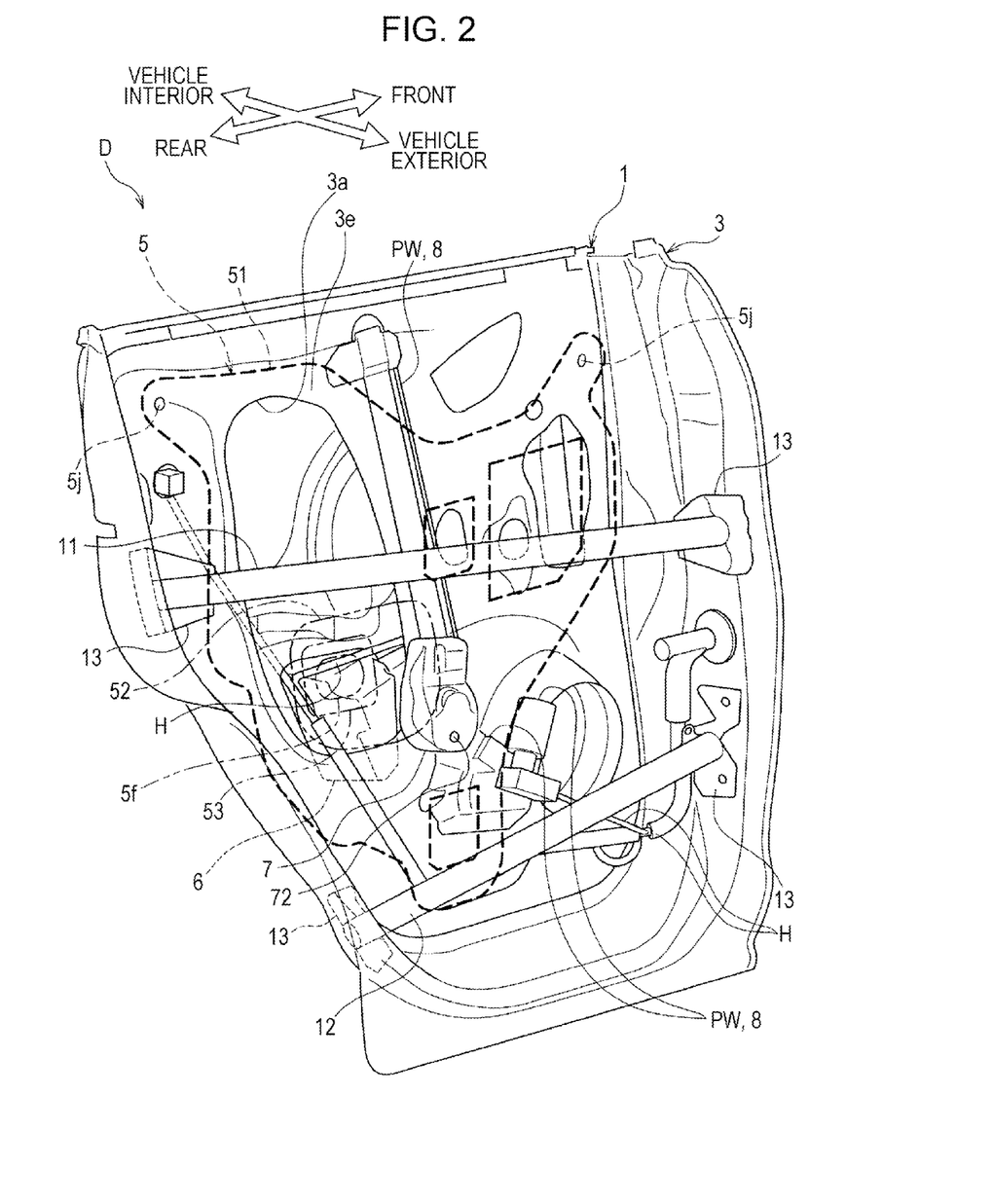
FIG. 2 is a schematic perspective view illustrating the internal structure of the vehicle door according to the embodiment of the present disclosure.

As shown in FIGS. 1 and 2, the door D is, for example, a hinge-type door, slide-type door, gull-wing-type door, or back door disposed on the left or right side or at the rear end of the vehicle body. The type of this door D is not particularly limited. An embodiment of the present disclosure will be described by taking a right-rear hinged door D that opens forward as an example.

A shown in FIG. 1, the door D mainly includes a door main body 1, an outer panel 2 (see FIG. 3) forming a door half of the door main body 1 on the vehicle exterior side, an inner panel 3 forming a door half of the door main body 1 on the vehicle interior R (see FIG. 3) side, a door trim 4 (see FIG. 3) installed on the vehicle interior side of the inner panel 3, a door hole seal 5 for waterproofing, a protruding member 6 protruded from the door trim 4 toward the outside of the vehicle interior R, an abutment member 7 (see FIG. 3) facing the protruding member 6, an electric component 8 installed in the door main body 1, and a harness H for electrically connecting the electric component, for example, to a power source (not shown).

Configuration of Door Main Body

Figure 3:
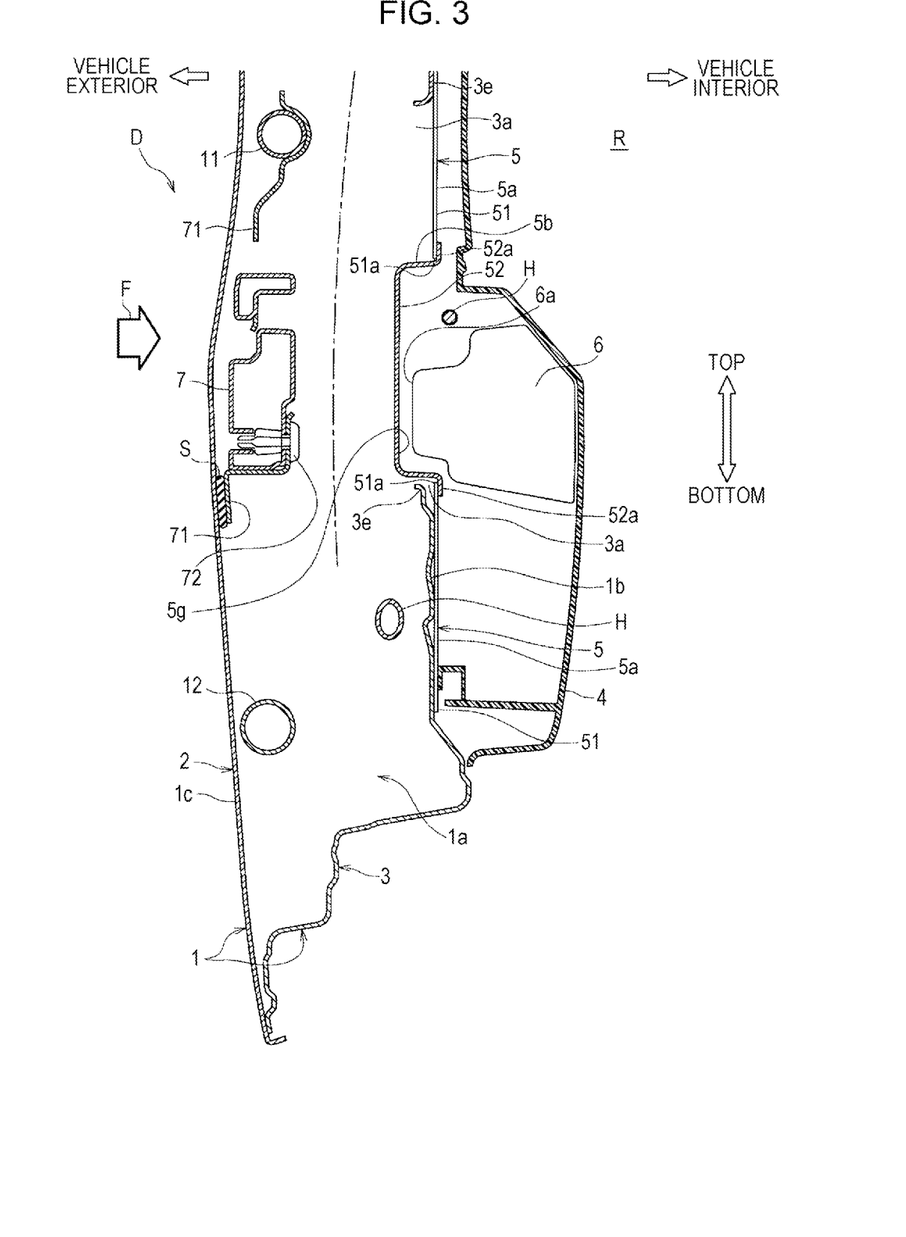
FIG. 3 is an end view taken along line III-III of FIG. 1.

As shown in FIG. 3, the door main body 1 is formed by joining the outer peripheral part of the outer panel 2 and the peripheral part of the inner panel 3, and a hollow portion 1a is formed in the door main body 1. In the hollow portion 1a, door beams 11 and 12, beam fixing brackets 13 (see FIG. 1), the abutment member 7, an abutment member bracket 71, the electric component 8 (see FIG. 1), a reinforcement member (not shown), and others (described later) are provided. The vehicle interior side surface 1b of the door main body 1 is formed by the inner panel 3, and the vehicle exterior side surface 1c of the door main body 1 is formed by the outer panel 2. Hinge members (not shown) are provided in the upper and lower parts of the front end of the door main body 1, and the door main body 1 is rotatably supported by the vehicle body. A sash (not shown) serving as a window frame is joined by welding to the upper end of the door main body 1. A window pane is attached to the inside of the sash movably up and down.

Configuration of Outer Panel

The outer panel 2 is a panel member formed by pressing a rolled steel plate, aluminum alloy rolled plate, magnesium alloy rolled plate, or the like. The abutment member bracket 71 fixed to the abutment member 7 with a clip 72 is bonded to the vehicle interior R side of the outer panel 2 with sealer S.

Configuration of Inner Panel

As shown in FIG. 1, the inner panel 3 is a panel member formed by pressing a rolled steel plate, aluminum alloy rolled plate, magnesium alloy rolled plate, or the like. In the inner panel 3, work holes 3a, 3b, and 3c, a speaker installation hole 3d, and holes for installing members and wiring (not shown) are formed. The inner panel 3 is provided with the door hole seal 5 that covers these holes.

The work holes 3a, 3b, and 3c are holes for installing internal components such as an electric component 8 provided in the hollow portion 1a. The work hole 3a is a hole, for example, for providing a power window device PW in the door main body 1. The work hole 3b is a hole, for example, for connecting the harness H. The work hole 3c is a hole, for example, for installing a door lock actuator (not shown). The speaker installation hole 3d is a hole to which a speaker (not shown) is attached. The speaker is attached to the speaker installation hole with, for example, a vibration-proofing seal material (not shown) therebetween.

Configuration of Door Beams

As shown in FIG. 1 and FIG. 2, the door beams 11 and 12 are reinforcing members for reinforcing the door main body 1, and are, for example, two metal pipes provided in the upper and lower parts of the door main body 1. The door beams 11 and 12 are disposed in the front-rear direction of the door main body 1 and are slightly inclined. Both ends of these are fixed to the front end 3e and rear end 3f of the inner panel 3 with the beam fixing brackets 13.

Configuration of Door Trim

As shown in FIG. 3, the door trim 4 is a member made of resin and provided on the vehicle interior side surface 1b of the inner panel 3, and is a so-called door lining. The protruding member 6 is provided on the vehicle exterior side of the door trim 4. A door handle, a power window switch, and the like (not shown) are attached to the vehicle interior side of the door trim 4.

Configuration of Door Hole Seal

Figure 4:
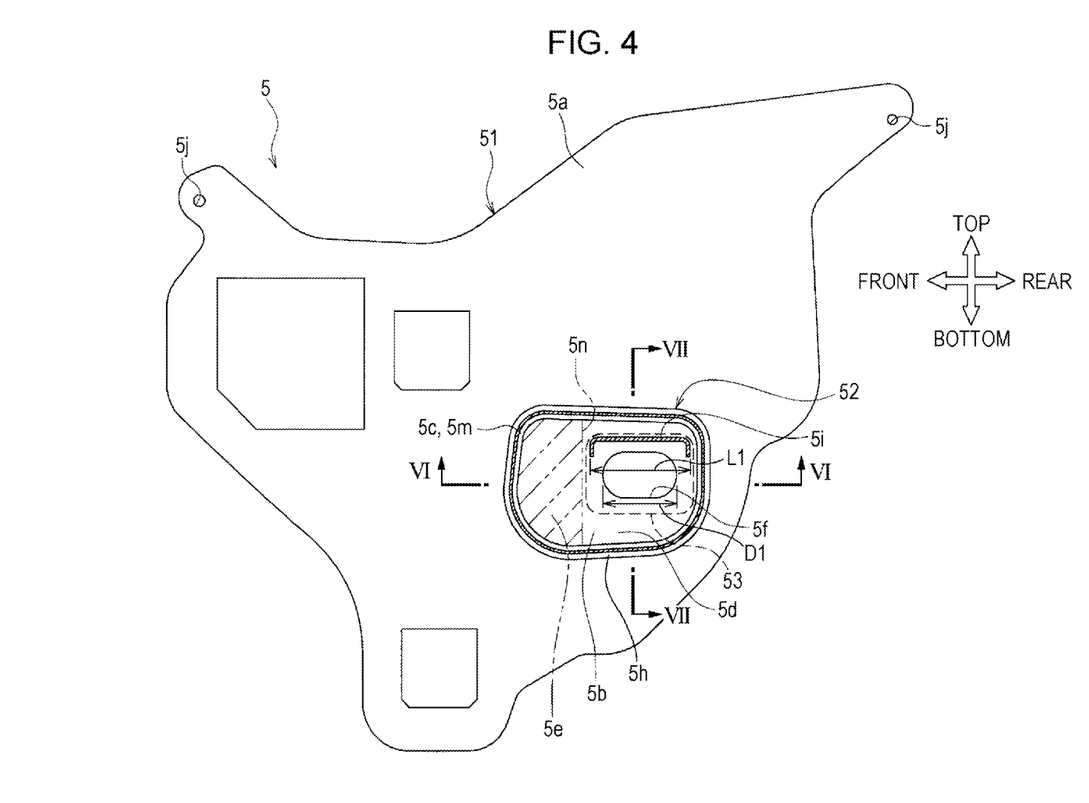
FIG. 4 is a schematic front view illustrating a door hole seal provided in the vehicle door according to the embodiment of the present disclosure.
Figures 8A, 8B:
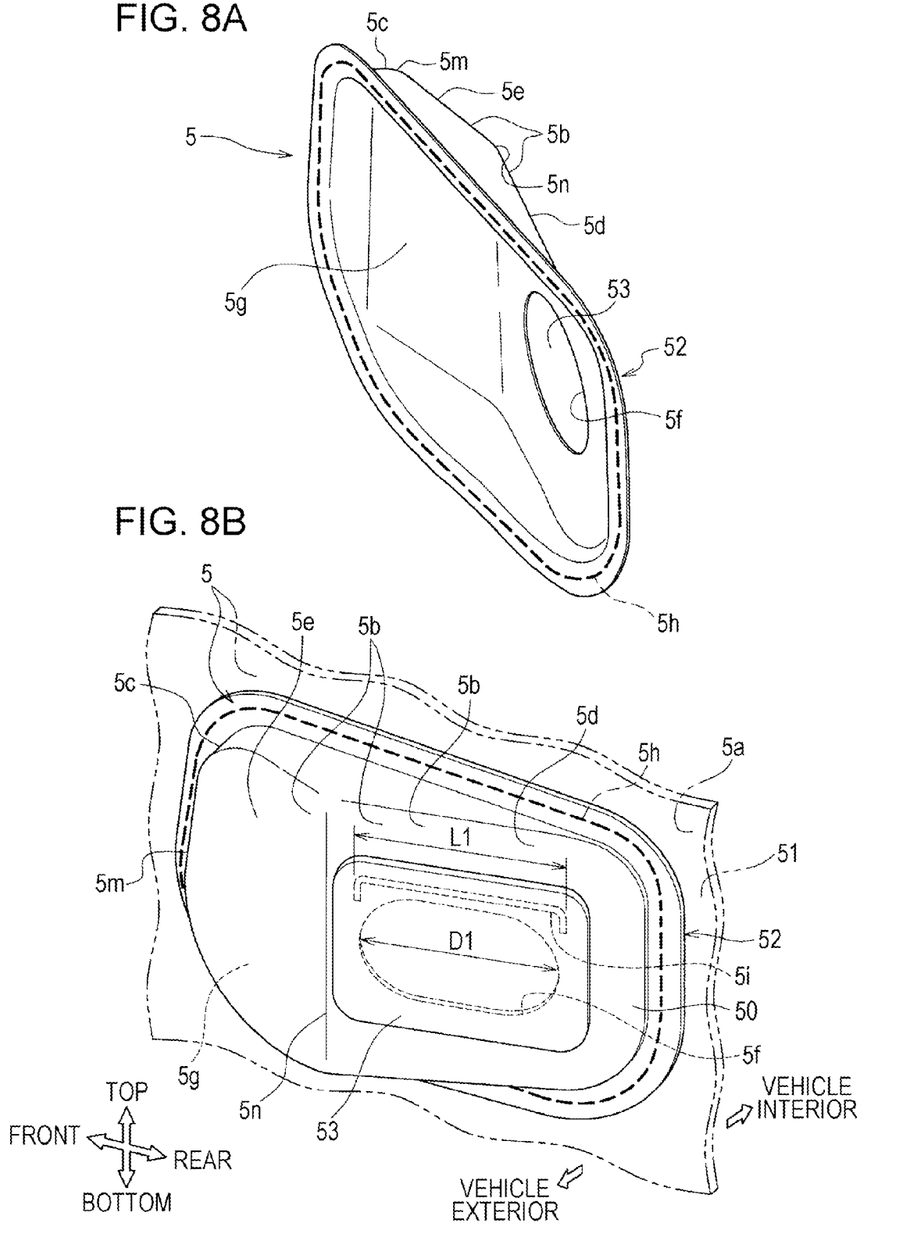

The door hole seal 5 is a waterproof sheet for ensuring a waterproof property between the inner panel 3 and the door trim 4 provided on the vehicle interior side thereof, and is a seal member made of resin for preventing rainwater from entering the vehicle interior from the vehicle exterior side of the inner panel 3. The door hole seal 5 is attached to the vehicle interior side surface 1b of the door main body 1 so as to cover the work holes 3a, 3b, and 3c (see FIG. 1) and shields it, and thus also insulates the sound of the speaker (not shown). As shown in FIG. 4, the door hole seal 5 is formed by integrally joining a seal main body 51 fixed to the inner panel 3 (see FIG. 3), a molded cup body 52 joined to the seal main body 51, and a flap 53 joined to the molded cup body 52. As shown in FIGS. 8A and 8B, a general surface 5a, a bulging portion 5b, a bulging side surface 5c, an inclined surface 5d, a second inclined surface 5e, a harness pull-out hole 5f, a facing portion 5g, a connecting portion 5h, a joining portion 5i, fixing holes 5j (see FIG. 1), and the like (described later) are formed in the door hole seal 5.

Configuration of Seal Main Body

In FIG. 1 and FIG. 2, the seal main body 51 shown by heavy dashed line is a member disposed so as to cover the work holes 3a, 3b, and 3c and the power window device PW, and is a film-like member (ultrathin plate-like member) made of resin. The seal main body 51 is a sheet that stops rainwater flowing down the window pane (not shown) from entering, is disposed so as to cover the whole central part of the inner panel 3 except for the speaker installation hole 3d, and has a shape and size such that it can cover the whole central part of the inner panel 3. A cup installation hole 51a (see FIG. 3) and the fixing holes 5j are formed in the seal main body 51.

Configuration of Cup Installation Hole

As shown in FIG. 3, a flange portion 52a formed on the outer peripheral part of the molded cup body 52 is placed on and joined to the edge of the cup installation hole 51a. The cup installation hole 51a is formed in an approximately rectangular shape elongate in the front-rear direction of the vehicle body. The cup installation hole 51a is formed at a position corresponding to the central part of the inner panel 3 where the work hole 3a covered by the seal main body 51 is located.

Configuration of Fixing Holes

As shown in FIG. 1 and FIG. 2, the fixing holes 5j, 5j are holes for attaching the door hole seal 5 to the inner panel 3. For example, clips (not shown) are inserted into the fixing holes 5j, 5j. The fixing holes 5j, 5j are formed in the outer peripheral parts of the upper ends of the front and rear of the seal main body 51.

Configuration of Molded Cup Body

As shown in FIG. 3, the molded cup body 52 is a rectangular cup-like member disposed so as to protrude from the general surface 5a of the seal main body 51 toward the vehicle exterior. In other words, the molded cup body 52 is a container-like member made of resin that is rectangular in vertical cross section and recessed toward the vehicle exterior. The molded cup body 52 is disposed on the vehicle exterior side of the protruding member 6 and on the vehicle interior side of the abutment member 7. The protruding member 6, the molded cup body 52, and the abutment member 7 are disposed so as to overlap with each other in the horizontal direction.

Configuration of Flap

As shown in FIG. 8B, the flap 53 is a thin plate member made of resin that is disposed so as to cover the harness pull-out hole 5f formed in the molded cup body 52 and is joined to the inclined surface 5d so as to be able to open and close the harness pull-out hole 5f. The flap 53 is fixed to the molded cup body 52 by joining the joining portion 5i at the upper end of the flap 53 to the inclined surface 5d. When the flap 53 is pressed from the vehicle interior side to the vehicle exterior side, the flap 53 rotates about the joining portion 5i and the harness pull-out hole 5f is opened.

Configuration of General Surface

As shown in FIG. 4, the general surface 5a is a flat surface extending along the vehicle interior side surface 1b of the door main body 1 (inner panel 3) and is a sheet-like surface of the door hole seal 5.

Configuration of Bulging Portion

Figure 5:
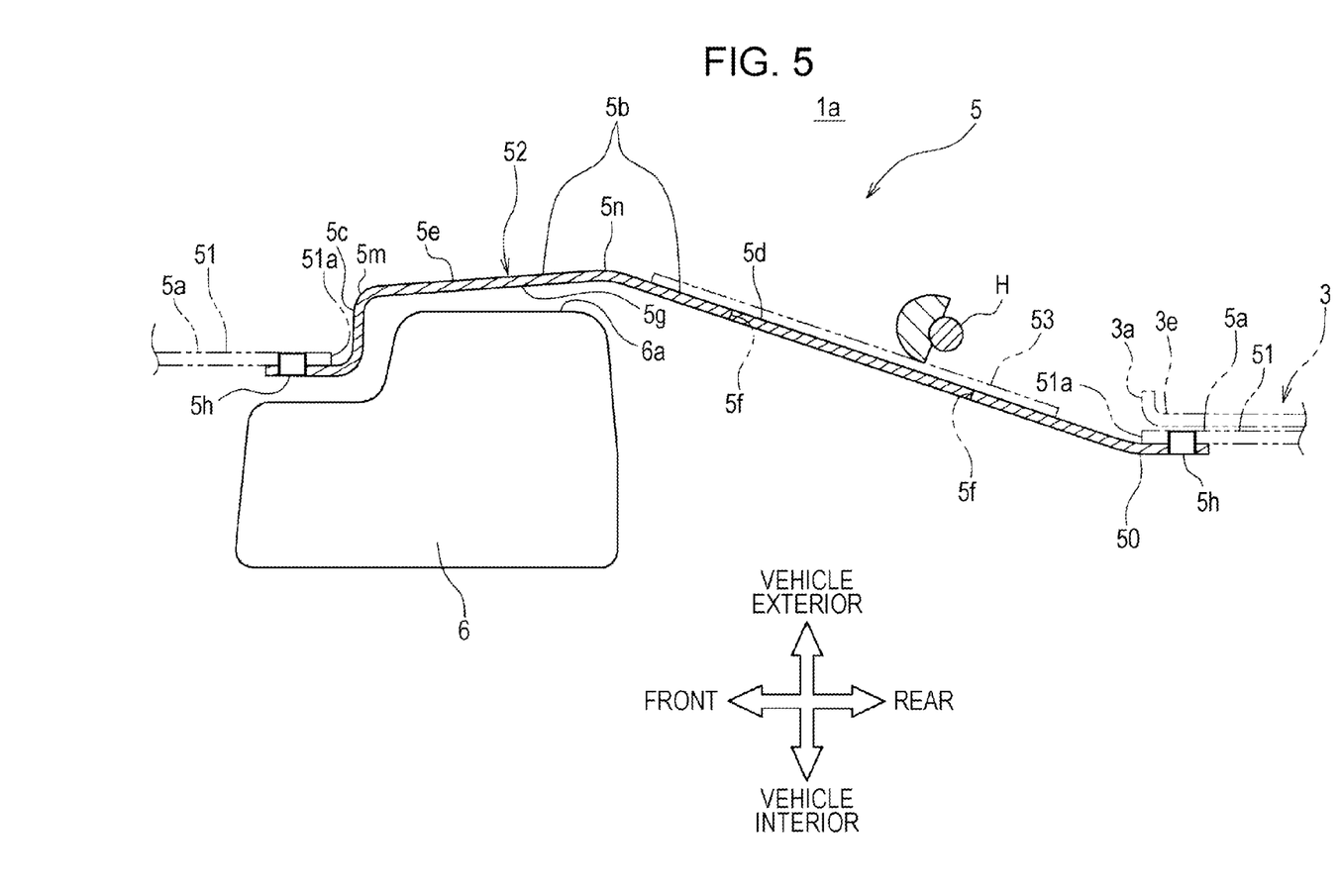
FIG. 5 is an end view taken along line V-V of FIG. 1.

As shown in FIG. 3, the bulging portion 5b is a portion formed so as to face the protruding member 6 and to bulge from the general surface 5a toward the inside of the hollow portion 1a of the door main body 1. As shown in FIG. 5, the edge on the vehicle exterior side of the bulging portion 5b includes the inclined surface 5d and the second inclined surface 5e and is formed in an approximately inverted V-shape in plan view. The bulging portion 5b is formed in a vertically long rectangular shape in side view (see FIG. 7). The inclined surface 5d is inclined such that the distance from the general surface 5a increases toward the central part of the bulging portion 5b in proportion to the distance from the connecting portion 5h between the general surface 5a and the bulging portion 5b. The bulging portion 5b has, on the vehicle interior side (back side) thereof, the facing portion 5g that faces the protruding member 6 and that extends from an end portion 5k on the opposite side of the bulging portion 5b from the foot portion 50 of the inclined surface 5d in the direction along the general surface 5a to an edge portion 5n of the inclined surface 5d and the second inclined surface 5e.

Configuration of Bulging Side Surface

Figure 6:
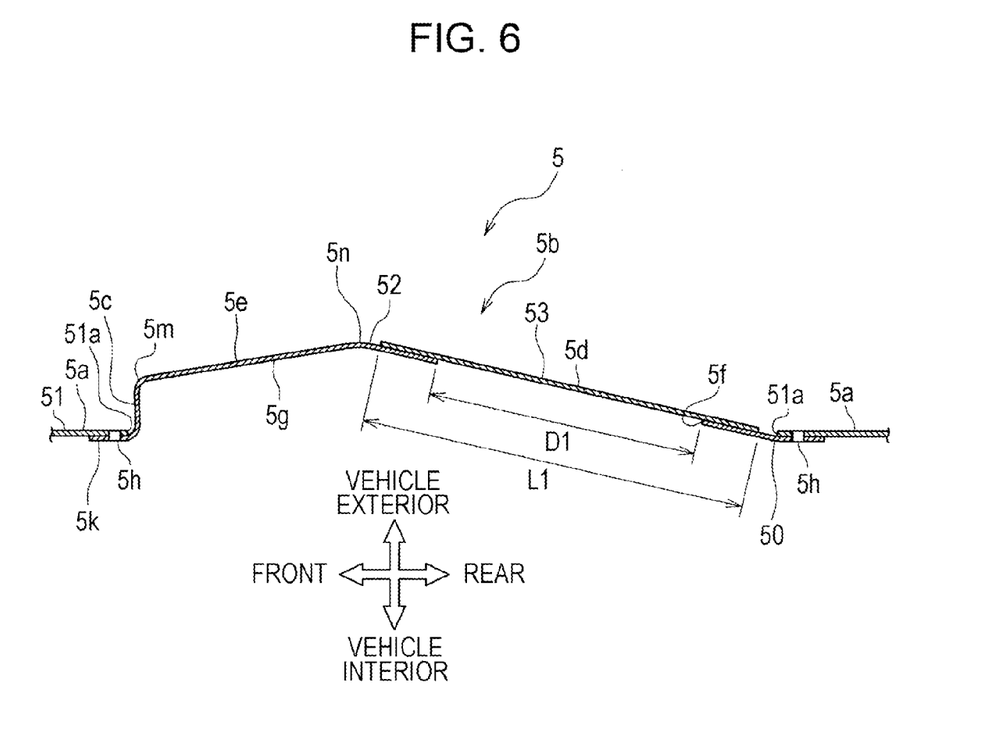
FIG. 6 is an end view taken along line VI-VI of FIG. 4.
Figure 7:
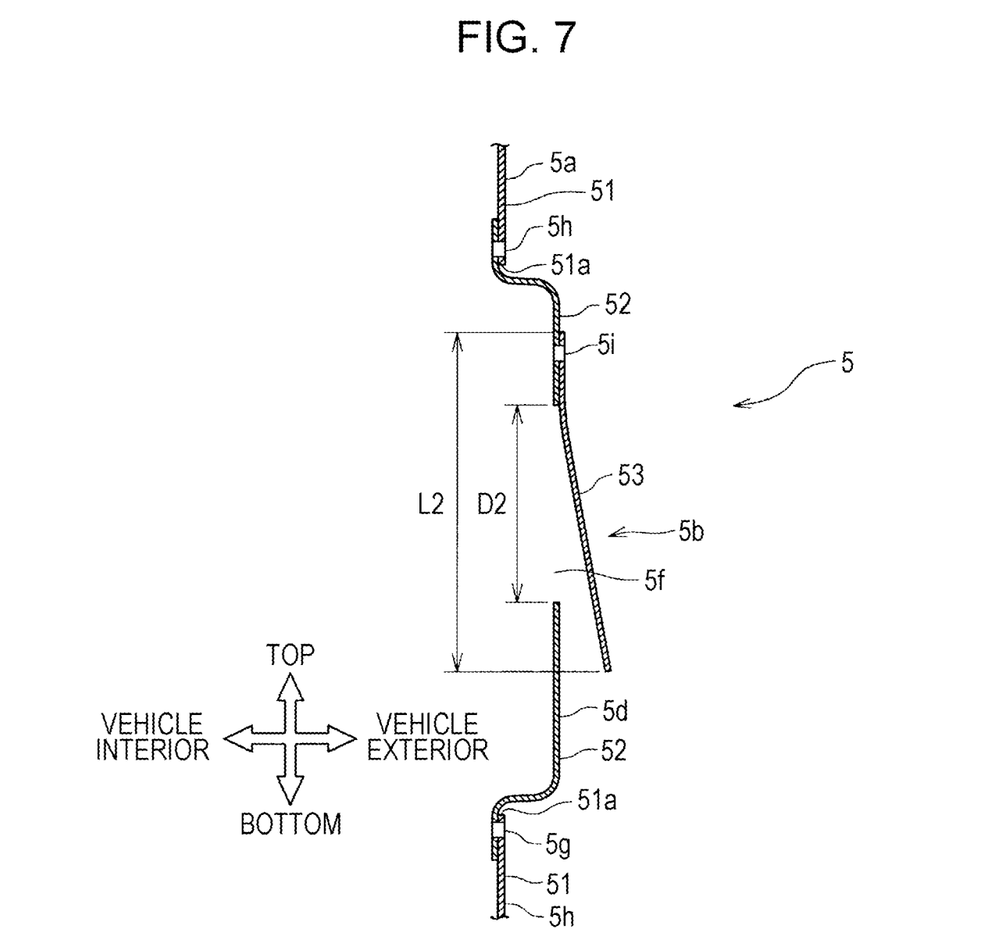
FIG. 7 is an end view taken along line VII-VII of FIG. 4.

As shown in FIG. 5 to FIG. 7, the bulging side surface 5c is a side surface of the bulging portion 5b protruding from the flat general surface 5a toward the vehicle exterior and is formed perpendicularly to the general surface 5a. The bulging side surface 5c is formed toward the vehicle exterior, from the general surface 5a to a position near the vehicle exterior side end 6a of the protruding member 6. That is to say, as shown in FIG. 5, the end 5m of the bulging side surface 5c is disposed slightly on the vehicle exterior side of the vehicle exterior side end 6a of the protruding member 6.

Configuration of Inclined Surface

The inclined surface 5d is an inclined surface formed so as to be downwardly inclined from the edge portion 5n of the bulging portion 5b toward the general surface 5a on the rear side thereof. The harness pull-out hole 5f is formed in the inclined surface 5d. The inclined surface 5d extends from the rear edge of the cup installation hole 51a toward the vehicle exterior, in a direction intersecting with the front-rear direction (door width direction), and is disposed at a position adjacent to the edge 3e of the work hole 3a (see FIG. 1) in the inner panel 3.

Configuration of Second Inclined Surface and Edge Portion

As shown in FIG. 5, the second inclined surface 5e is a surface formed so as to be gently downwardly inclined from the edge portion 5n of the inclined surface 5d in the opposite direction of the inclined surface 5d (toward the front). That is to say, the second inclined surface 5e is inclined from the end 5m of the bulging side surface 5c to the edge portion 5n. The edge portion 5n is the edge of the bulging portion 5b formed in an inverted V-shape in plan view, and is part of the bulging portion 5b that is most protruded toward the vehicle exterior. The edge portion 5n is disposed on the vehicle exterior side of the vehicle exterior side end 6a of the protruding member 6.

Configuration of Harness Pull-Out Hole

As shown in FIGS. 8A and 8B, the harness pull-out hole 5f is a hole through which the harness H (see FIG. 1) is disposed, and is, for example, an elongate hole that is longer in the front-rear direction of the vehicle body. The harness pull-out hole 5f is disposed away from the protruding member 6 in the front-rear direction so as not to overlap with the protruding member 6 as viewed from the vehicle interior-exterior direction.

Configuration of Facing Portion

As shown in FIG. 5, the facing portion 5g is part of the door hole seal 5 that faces the protruding member 6. The inclined surface 5d is disposed between the facing portion 5g and the edge 3e of the work hole 3a (see FIG. 1). The facing portion 5g includes the bulging side surface 5c and the second inclined surface 5e. The abutment member 7 (see FIG. 3) is disposed on the vehicle exterior side of the facing portion 5g. That is to say, the facing portion 5g, the abutment member 7 (see FIG. 3), and the protruding member 6 are aligned in the vehicle interior-exterior direction (vehicle width direction) so that they overlap with each other when the vehicle has a side collision, is pressed from the vehicle exterior toward the vehicle interior, and is deformed.

Configuration of Connecting Portion

As shown in FIG. 8B, the connecting portion 5h is a portion that connects the edge of the cup installation hole 51a of the seal main body 51 and the flange portion 52a of the molded cup body 52. The connecting portion 5h connects the seal main body 51 and the molded cup body 52, for example, with adhesive or by ultrasonic or vibration welding.

Configuration of Joining Portion

The joining portion 5i is a portion that joins the flap 53 to the molded cup body 52 with adhesive, by welding, or the like, and it is disposed on the inclined surface 5d above the harness pull-out hole 5f. The joining portion 5i is formed between the upper edge of the flap 53 and the harness pull-out hole 5f, along the upper edge of the harness pull-out hole 5f. The length L1 of the joining portion 5i in the door width direction is larger than the width D1 of the harness pull-out hole 5f in the door width direction.

Configuration of Protruding Member

As shown in FIG. 3, the protruding member 6 is a cushion member protruded from the door trim 4 toward the vehicle exterior, and is a so-called side collision pad (collision pad). The protruding member 6 is disposed in the door trim 4 and at a position on the vehicle exterior side of the waist portion of the occupant, absorbs the impact load to which the vehicle is subjected from the lateral direction owing to a side collision or the like, and protects the occupant. The protruding member 6 is fixed to the inside of the door trim 4 with a protruding member fixing clip 61 (see FIG. 1).

Configuration of Abutment Member

As shown in FIG. 3, the abutment member 7 is disposed so as to press the bulging portion 5b and the protruding member 6, which have elasticity, for example, when the vehicle is subjected to an impact load from the outside of the vehicle interior R owing to a side collision or the like. The abutment member 7 is provided in the hollow portion 1a of the door main body 1 and faces the protruding member 6 as viewed from the vehicle interior-exterior direction.

Configuration of Electric Components

As shown in FIG. 1 and FIG. 2, the electric components 8 are electric components installed in the door D, and are, for example, a power window device PW, a door lock device (not shown), and a speaker (not shown). The power window device PW is a device installed in the door main body 1 and for raising and lowering a window pane (not shown). A harness (not shown) is connected to the power window device PW. The power window device PW mainly includes a guide member that supports a window pane (not shown), guide rails that guide the upward/downward movement of the window pane, a power window regulator for raising and lowering the window pane, and a power window switch for operating the power window regulator. The door lock device (not shown) is a door lock actuator that locks and unlocks the door D. A harness H that is routed from the front end 3e of the inner panel 3 to the rear end 3f thereof is connected to the door lock device. The speaker (not shown) is installed in the speaker installation hole 3d provided near the front end 3e of the inner panel 3. A harness (not shown) is connected to the speaker.

Configuration of Harness

Figure 9:
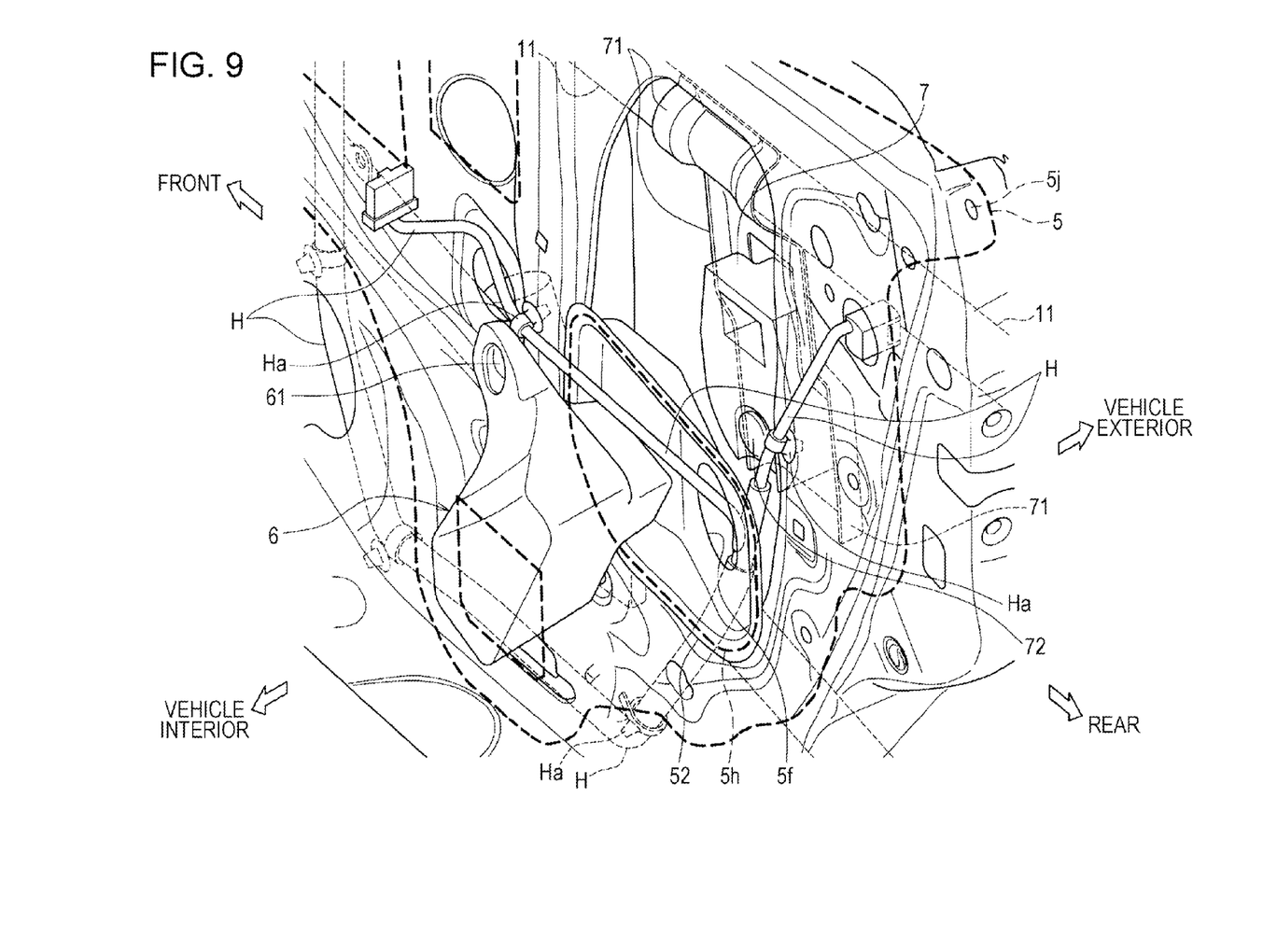
FIG. 9 illustrates an example of a vehicle door according to an embodiment of the present disclosure, and is a main portion enlarged perspective view illustrating the arrangement of the molded cup body for the door hole seal.

As shown in FIG. 1, the harnesses H are electric wires for electrically connecting the electric components 8, such as the door lock device (not shown), the speaker (not shown), and the power window device PW, installed in the door D. For example, the harness H connected to the door lock device is routed from the hollow portion 1a of the door main body 1 through the harness pull-out hole 5f of the door hole seal 5 to the door trim 4 side. As shown in FIG. 9, the harness H is passed through the harness pull-out hole 5f, and the part of the harness H that has been passed through the harness pull-out hole 5f is supported by the edge of the harness pull-out hole 5f and is fastened to the inner panel 3 with a harness fixing clip Ha.

Operation

Next, the operation of the vehicle door according to the embodiment of the present disclosure will be described with reference to the drawings. For example, when the vehicle has a side collision, as shown in FIG. 3, the outer panel 2 is subjected to an impact force F from the vehicle exterior toward the vehicle interior, is pressed toward the vehicle interior R, is deformed, and moves the abutment member 7 to the vehicle interior R. The abutment member 7 presses the protruding member 6 having a cushioning property, with the bulging portion 5b disposed in the work hole 3b in side view therebetween, and the shock is absorbed. For this reason, the load applied to the waist portion of the occupant from the door trim 4 located on the vehicle interior side of the protruding member 6 is also reduced.

As shown in FIG. 1, the harness pull-out hole 5f and the harness H inserted in the harness pull-out hole 5f are disposed away from the protruding member 6 in the front-rear direction of the vehicle body so as not to overlap with the protruding member 6 as viewed from the vehicle interior-exterior direction. For this reason, when the vehicle has a side collision, the harness H can be prevented from being interfered with by the abutment member 7, or being caught between the abutment member 7 and the protruding member 6, being subjected to impact force, and being thereby broken or damaged.

As shown in FIG. 5, the harness pull-out hole 5f (see FIG. 6) into which the harness H is inserted is disposed in the inclined surface 5d downwardly inclined from the edge portion 5n of the bulging portion 5b, and is thereby disposed at a position where the amount of bulging (protruding) toward the vehicle exterior is smaller than that of the edge portion 5n. For this reason, when the outer panel 2 shown in FIG. 3 is subjected to an impact force F and the abutment member 7 presses the bulging portion 5b, first, the edge portion 5n, which is most protruded toward the vehicle exterior, and the vicinity thereof are deformed, the facing portion 5g presses the protruding member 6, and the shock is thereby absorbed.

As shown in FIG. 5, the harness H is disposed at the position of the inclined surface 5d and the harness pull-out hole 5f located on the vehicle interior side of the edge portion 5n, and is disposed away from the protruding member 6 in the front-rear direction of the vehicle body. Thus, the interference with the protruding member 6 can be reliably suppressed. As a result, the harness H can be protected from the side collision of the vehicle.

As shown in FIG. 1, on the vehicle interior side surface 1b of the door main body 1, the work holes 3a to 3c and the whole central part of the inner panel 3 are covered with the door hole seal 5. Thus, rainwater flowing down the window pane (not shown) can be stopped from entering the hollow portion 1a of the door main body 1.

As shown in FIG. 8B, a harness H (see FIG. 9) is routed at a position in the door hole seal 5 where the harness pull-out hole 5f is located. The joining portion 5i is formed throughout the upper part of the harness pull-out hole 5f, and the upper end of the flap 53 is joined by the joining portion 5i. For this reason, the door hole seal 5 can prevent rainwater dropping from above from entering the vehicle interior through the flap 53 and the harness pull-out hole 5f, and an excellent waterproof property can be ensured.

Modifications

It goes without saying that the present disclosure is not limited to the above-described embodiment, various modifications and variations may be made without departing from the technical idea of the present disclosure, and such modifications and variations are also included in the scope of the present disclosure.

For example, although in the above-described embodiment, a side collision pad provided in the door trim 4 is taken as an example of the protruding member 6, the protruding member 6 is not limited to this. The protruding member 6 may be a speaker (not shown) provided in the door main body 1.

Although in the above-described embodiment, the bulging portion 5b is formed in the molded cup body 52 joined to the seal main body 51 of the door hole seal 5, the bulging portion 5b may be formed by forming the molded cup body 52 integrally with the seal main body 51. That is to say, the molded cup body 52 having the bulging portion 5b may be integral with the seal main body 51 or may be a separate component joined to the seal main body 51.

We claim:

1. A vehicle door comprising:
a door main body including a hollow portion therein and a work hole provided in a vehicle interior side surface thereof;
a door hole seal attached to the vehicle interior side surface so as to cover the work hole;
a door trim provided on the vehicle interior side surface;
a protruding member protruding from the door trim toward the inside of the hollow portion; and
a harness arranged in the hollow portion,
wherein the door hole seal includes a sheet like member including a general surface, the general surface being a flat surface extending along the vehicle interior side surface, a bulging portion facing the protruding member and bulging from the general surface toward the inside of the hollow portion, and a harness pull-out hole disposed in a position not to overlap with the protruding member as viewed from a vehicle interior-exterior direction such that the harness is passed through the harness pull-out hole from the hollow portion toward the door trim,
wherein the protruding member includes an outer end portion located in an outer area compared to the general surface in the vehicle interior-exterior direction,
wherein the bulging portion includes an inclined wall inclined with respect to the general surface and extending toward the inside of the hollow portion, and a facing portion facing the outer end portion of the protruding member in the vehicle interior-exterior direction, and
wherein the inclined wall includes the harness pull-out hole therein.

2. The vehicle door according to claim 1, wherein the facing portion of the bulging portion extends continuously from the inclined wall toward a direction opposite to the inclined wall.

3. The vehicle door according to claim 2, wherein a border portion between the inclined wall and the facing portion is disposed on a vehicle exterior side of a vehicle exterior side end of the protruding member, and the facing portion includes a bulging side surface extending from the general surface toward the vehicle exterior to a vicinity of the vehicle exterior side end of the protruding member, and a second inclined surface extending from an end of the bulging side surface to the inclined wall.

4. The vehicle door according to claim 3, wherein the inclined wall is provided adjacent to the edge of the work hole, and the inclined wall is disposed between the facing portion and the edge of the work hole.

5. The vehicle door according to claim 1, wherein the door hole seal has a flap covering the harness pull-out hole, the flap includes a joining portion joined to the door hole seal above the harness pull-out hole, the length of the joining portion in a door width direction is larger than the width of the harness pull-out hole in the door width direction, and the inclined wall extends in a direction intersecting with the door width direction.

6. The vehicle door according to claim 1, wherein the door main body includes an abutment member provided in the hollow portion and facing the protruding member, and the harness pull-out hole is provided in a position not to overlap with the abutment member as viewed from a vehicle interior-exterior direction.

7. The vehicle door according to claim 1, wherein the bulging portion is connected to the general surface at the perimeter of the bulging portion by a connecting portion, and
wherein the inclined wall extends from the connecting portion toward the inside of the hollow portion.

8. A vehicle door comprising:
a door main body including a hollow portion therein and a work hole provided in a vehicle interior side surface thereof;
a door hole seal attached to the vehicle interior side surface so as to cover the work hole;
a door trim provided on the vehicle interior side surface;
a protruding member protruding from the door trim toward the inside of the hollow portion; and
a harness arranged in the hollow portion,
wherein the door hole seal includes a sheet like member including a general surface, the general surface being a flat surface extending along the vehicle interior side surface, a bulging portion facing the protruding member and bulging from the general surface toward the inside of the hollow portion, and a harness pull-out hole disposed in a position not to overlap with the protruding member as viewed from a vehicle interior-exterior direction such that the harness is passed through the harness pull-out hole from the hollow portion toward the door trim,
wherein the bulging portion includes an inclined wall inclined with respect to the general surface and extending toward the inside of the hollow portion,
wherein the inclined wall includes the harness pull-out hole therein, and
wherein the door main body includes an abutment member provided in the hollow portion and facing the protruding member, and the harness pull-out hole is provided in a position not to overlap with the abutment member as viewed from a vehicle interior-exterior direction.

9. A vehicle door comprising:
a door main body including a hollow portion therein and a work hole provided in a vehicle interior side surface thereof;
a door hole seal attached to the vehicle interior side surface so as to cover the work hole;
a door trim provided on the vehicle interior side surface;
a protruding member protruding from the door trim toward the inside of the hollow portion; and
a harness arranged in the hollow portion,
wherein the door hole seal includes a sheet like member including a general surface, the general surface being a flat surface extending along the vehicle interior side surface, a bulging portion facing the protruding member and bulging from the general surface toward the inside of the hollow portion, and a harness pull-out hole disposed in a position not to overlap with the protruding member as viewed from a vehicle interior-exterior direction such that the harness is passed through the harness pull-out hole from the hollow portion toward the door trim,
wherein the bulging portion includes an inclined wall inclined with respect to the general surface and extending toward the inside of the hollow portion,
wherein the inclined wall includes the harness pull-out hole therein,
wherein the bulging portion is connected to the general surface at the perimeter of the bulging portion by a connecting portion, and
wherein the inclined wall extends from the connecting portion toward the inside of the hollow portion.

* * * * *